(No Model.)
E. A. UEHLING & A. STEINBART.
PYROMETER.
No. 503,337. Patented Aug. 15, 1893.
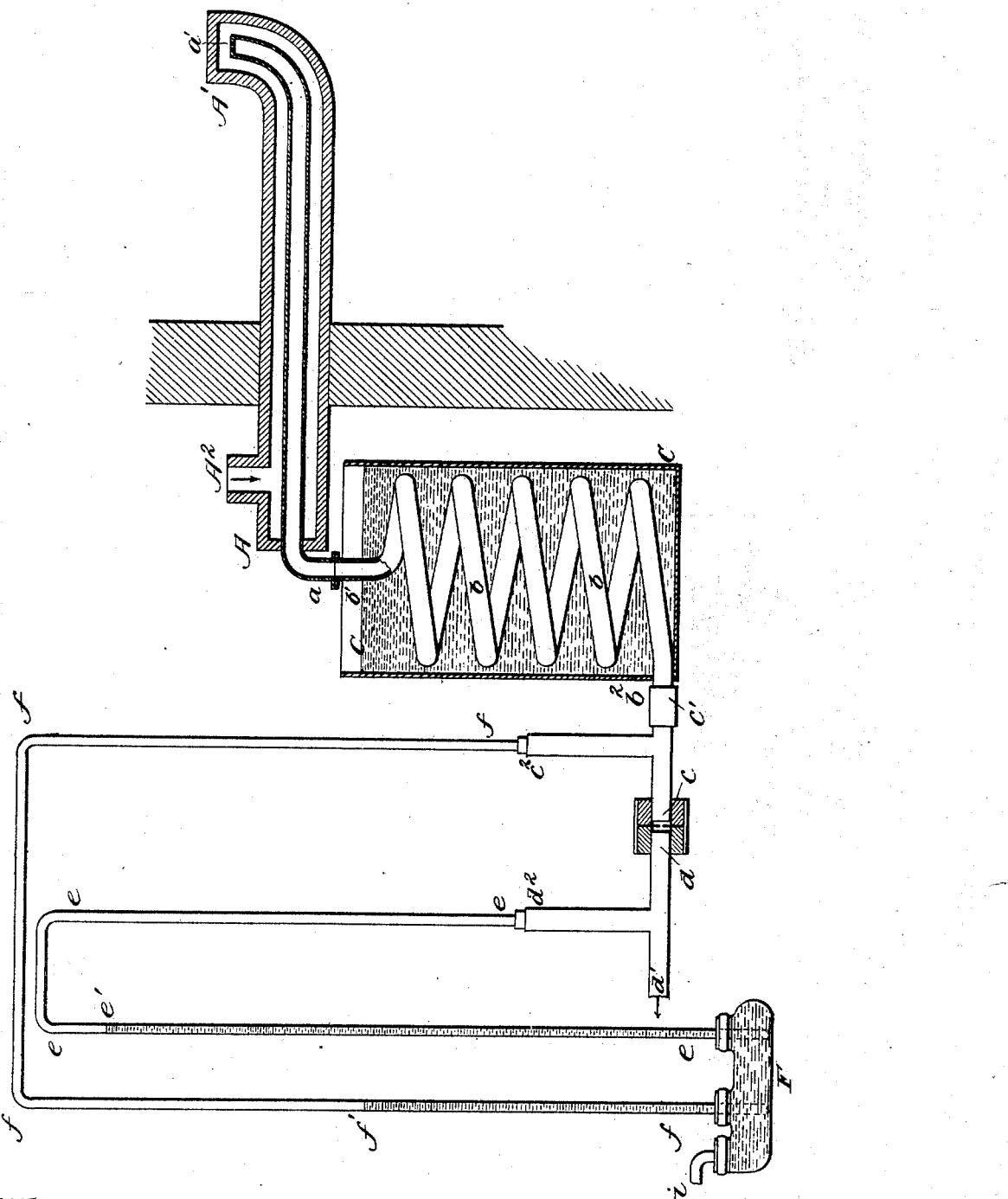
Witnesses
Edwin L. Bradford
[signature]
Inventors
Edward A. Uehling
Alfred Steinbart
By Johnson & Johnson
their Attorneys

UNITED STATES PATENT OFFICE.

EDWARD A. UEHLING AND ALFRED STEINBART, OF BIRMINGHAM, ALABAMA.

PYROMETER.

SPECIFICATION forming part of Letters Patent No. 503,337, dated August 15, 1893.

Application filed April 20, 1893. Serial No. 471,107. (No model.)

*To all whom it may concern:*

Be it known that we, EDWARD A. UEHLING, a citizen of the United States, and ALFRED STEINBART, a subject of the Emperor of Germany, residents of Birmingham, in the county of Jefferson and State of Alabama, have invented certain new and useful Improvements in Pyrometers, of which the following is a specification.

The object of our invention is to produce an instrument for accurately and continuously indicating high temperatures. The principle involved is the law of the passage of gas or air under a constant forced flow through small apertures. In the provision of a device for effecting this object its primary feature is the forcing of air or gas through two successive small apertures, whereby the tension between them will remain constant so long as the temperature of the passing fluid remains equal and constant at both apertures, and whereby a change of temperature at either one or the other of the apertures will also cause a change of tension between them. If therefore, the fluid as it passes through one of these apertures, is made to vary with the temperature to be measured, while at the others constantly kept a certain normal temperature, then the variation of the tension between the apertures will be a measure of the degree of heat the air has at the time of entering into the space or conduit between and connecting the two apertures, and hence of the temperature to be measured. For carrying out this operation and obtaining this result, our invention consists of certain novel parts and combinations of parts which are embodied in the structure illustrated in the accompanying drawing. This structure however, we desire it to be distinctly understood is intended only as an illustration of one form of device embodying our invention which may be embodied in other and different forms.

In the apparatus illustrated in the drawing it will be understood that the end $A'$ of the tube $A, A^2$, is located in the space, or closure, or connected with the device the temperature of which is to be determined or constantly indicated, such for instance as a hot air blast now universally used in the smelting of iron, or of an annealing furnace. For this purpose the inner end of this tube is closed and is preferably turned up or swelled. The other end of this tube extends outside of the closure and has an opening $A^2$ through which the fluid to be heated enters. Within this tube is placed a tube $a, a'$, so that there will be a free space all around it. That end which terminates within the closed end of the outer tube, has a small opening or aperture $a'$; while its other end which passes through and out of the outer tube, at that end which is outside of the closure the temperature of which is to be determined, and connects with a coil or worm $b, b', b^2$, which at its other end at $b^2$, connects with the T-couplings $c, c', c^2$, and $d, d', d^2$, between which at their junction $c$, and $d$, is located a diaphragm or thin plate having an aperture similar to that in the tube at $a'$, within the outer heat transmitting pipe. The T-couplings are connected by their vertical branches $c^2, d^2$, with barometer tubes $f$ and $e$ which are immersed in a suitable liquid in a reservoir F open at $i$ to the atmosphere.

An index $f'$ marked off in degrees can readily be attached to the tube $f$ so that the degrees of heat can be read off, but any other form of vacuum gage may be used and graduated suitably for the same purpose.

C is a vessel containing a liquid kept at a constant temperature, preferably water at the boiling point, or the melting point of ice through which the worm or coil passes which forms a prolongation of the inclosed pipe $a, a'$.

The operation is as follows: The heat receiving tube being open at $A^2$ and receiving the air to be heated and the T-coupling $d'$, connected with a partial vacuum of constant tension indicated by the column $e'$ of the pipe $e$, the hot air from the heated tube $A'$ is drawn through the aperture $a'$ into the inner tube $a$ and through its coiled prolongation $b'$, which may in fact be of any shape or construction, which offers sufficient cooling surface to insure a constant temperature, thence through the aperture $c$ into the partial vacuum which is connected at $d'$ to the T-coupling in communication with said aperture, $c$. So long as the air which enters at $a'$ is of the same temperature as when passing through the aperture $c$, the tension between the two apertures $a'$ $c$, will remain constant, and be indicated by the index on the tube $f'$ by the column therein. Thus if the end $A'$ of the air receiving tube becomes heated, the air entering the aperture $a'$ from said heating tube will assume the same temperature, but in passing through the cooling worm it is reduced back to a constant normal temperature. This being the case the difference of temperatures of the air as it passes the two apertures is due to the temperature at $A'$ and hence the change of tension, which results and which is indicated by the column in $f, f'$, is a measure of the temperature at $A'$. If however, the temperature at the aperture $a'$ changes the flow of the gas or air through the apertures will be changed and with it the tension between the apertures, causing the column $f'$ to rise or fall, and thereby indicate the degree of change.

The apparatus can be adapted for use anywhere for the purpose designed and the degree of heat which it will indicate is limited only by the material of which the tubes subjected to the heat, are made.

Referring to the registration of the temperature it will be understood that there are no thermometer tubes, nor necessarily any mercurial tubes, in connection with our pyrometer. Our invention requires simply some form of vacuum gage if the pyrometer is operated by suction, or pressure gage if operated by pressure, which may be a mercurial or any other column, or a spring-gage, many forms of which are available. It will also be understood that the action of our pyrometer depends upon the law of the flow of gases through small apertures, according to which if air be drawn through two successive apertures by the aid of a common suction, the temperature between these apertures will remain constant so long as the temperature of the air remains equal and constant at both apertures, i. e., while flowing through. A change of one temperature, however, at either one or the other of the apertures will also cause a change of temperature between them. The tension is the measure of the temperature to be determined. To make this an accurate measure of the temperature at $a'$ (which is the same as that of the space surrounding the inclosing tube $A A'$, which may be filled with air, as in the illustration, or with molten metal, slag, glass or any other substance into which the tube $a \; a'$ may be inserted) it is essential that the air in passing through the aperture $c$ should be of a constant temperature and for this reason it is passed through the cooling tube $b$, while at $a'$ it varies with the temperature to be measured. Of course it is well known that gases expand by heat and contract in cooling. If the temperature of the air passing in at $a'$ is the same as in passing out at $c$, the tension between the two apertures (shown by the column $f \; f$) will be due to the friction in passing through the small holes or apertures. If however, the air at $a'$ is heated its volume will be proportionately increased, and hence less of it can enter through $a'$. If now it be cooled to the normal temperature before it passes out at $c$, a less volume will have to pass through $c$, in consequence of which the partial vacuum (suction) will act more on the space between the two apertures and the column in $f f$ will rise to show the change of tension and temperature at $a'$.

We claim as our invention—

1. The herein described method of determining the temperature which consists in passing a gas through a tube or chamber having two apertures, the gas entering one aperture at the degree of temperature to be indicated and flowing through the other aperture at a constant temperature, the change in the tension of the gas between the two apertures being the measure of the temperature to be indicated.

2. The herein described method of determining the temperature which consists in passing a gas through a tube or chamber having two apertures, the gas being raised to the degree of temperature to be indicated prior to entering one of the apertures, then reducing the gas to a normal degree before it flows through the other aperture, the change in the tension of the said gas between the said apertures being a measure of the temperature to be determined.

3. The herein described means for determining temperature, consisting of a tube having two apertures, means for passing a gas through the tube under pressure, the gas entering one aperture at the degree of temperature to be determined and a reducing device to bring the gas to a normal temperature before flowing through the other aperture, the change of tension of the gas between the two apertures being a measure to determine the degree of temperature to be ascertained.

4. The herein described means for determining temperature consisting of a tube having two apertures means for passing the gas under pressure through the tubes, the gas being raised to the degree of temperature to be ascertained before entering one aperture, a reducing device to bring the gas to a normal temperature before flowing through the other aperture and a register having connection with the tube to indicate the change in tension between the said two apertures and the degree of temperature to be determined.

5. A pyrometer consisting of a chamber in which a gas is raised to the degree of temperature to be ascertained, a tube having a portion projecting into the said chamber and having two apertures, a reducing device applied to the other portion of the said tube to bring the gas to a normal temperature before leaving the tube, a register having connection with the said tube to indicate the change in tension of the gas between the said apertures and means for passing a gas through the said tubes under pressure substantially as and for the purpose set forth.

6. A pyrometer consisting of a tube having two small apertures and adapted to be connected at one end to a pressure or partial vacuum chamber, a gage to indicate the tension of the said chamber, the gas being raised to the degree of temperature to be determined before entering one aperture, a cooling device to reduce the temperature of the gas to a normal or certain degree before flowing through the other aperture, and a register to indicate the change in tension of the gas between the said apertures, substantially as described.

7. The herein described pyrometer consisting of a chamber having an inlet at or near one end, and a tube having a portion inserted within the said chamber, and having two apertures, a cooling device applied to the other portion of the tube to reduce the gas passing through the same to a normal temperature before leaving said tube through the outlet aperture, means for creating a tension on the gas in the tube, and registers to indicate the primary tension of the gas and the differences in tension between the said two apertures, substantially as described.

In testimony whereof we have hereunto signed this specification in the presence of witnesses.

EDWARD A. UEHLING.
ALFRED STEINBART.

Witnesses:
H. C. OSMOND,
S. BOYER.